(12) United States Patent
Shabestari et al.

(10) Patent No.: US 12,179,780 B2
(45) Date of Patent: Dec. 31, 2024

(54) METHOD FOR ONLINE DIRECT ESTIMATION AND COMPENSATION OF FLUX AND TORQUE ERRORS IN ELECTRIC DRIVES

(71) Applicant: Karma Automotive LLC, Irvine, CA (US)

(72) Inventors: Parisa Mohammadalizadeh Shabestari, Irvine, CA (US); Younes Sangsefidi, Irvine, CA (US); Geng Niu, Irvine, CA (US)

(73) Assignee: Karma Automotive LLC, Irvine, CA (US)

( * ) Notice: Subject to any disclaimer, the term of this patent is extended or adjusted under 35 U.S.C. 154(b) by 0 days.

(21) Appl. No.: 17/723,094

(22) Filed: Apr. 18, 2022

(65) Prior Publication Data

US 2022/0306133 A1    Sep. 29, 2022

Related U.S. Application Data

(63) Continuation of application No. 16/730,218, filed on Dec. 30, 2019, now Pat. No. 11,305,784.

(51) Int. Cl.
*B60W 50/029* (2012.01)
*B60W 50/02* (2012.01)
*B60W 50/00* (2006.01)

(52) U.S. Cl.
CPC ...... *B60W 50/029* (2013.01); *B60W 50/0205* (2013.01); *B60W 2050/0026* (2013.01); *B60W 2050/0056* (2013.01); *B60W 2510/087* (2013.01)

(58) Field of Classification Search
CPC .................. B60W 50/029; B60W 50/0205
See application file for complete search history.

(56) References Cited

U.S. PATENT DOCUMENTS

| 6,008,618 A | 12/1999 | Bose et al. |
| 2012/0068640 A1 | 3/2012 | Stulz et al. |
| 2013/0320897 A1* | 12/2013 | Hirono ..................... H02P 6/182 |
| | | 318/400.34 |
| 2015/0116053 A1* | 4/2015 | Stevenson ............ A61N 1/3754 |
| | | 333/176 |

(Continued)

OTHER PUBLICATIONS

EPO, Extended European Search Report for Application 20911112.9 dated Dec. 14, 2023.

*Primary Examiner* — Jess Whittington
(74) *Attorney, Agent, or Firm* — Honigman LLP; Grant Griffith; Thomas J. Appledorn

(57) ABSTRACT

An online method of detecting and compensating for errors in flux estimation in operation of a motor system. The method includes determining a voltage compensation term by comparing an expected voltage and an actual voltage. The method also includes determining a flux compensation term by passing the voltage compensation term through a low-pass filter, and determining a corrected flux component value by comparing the flux compensation term with a flux value obtained from a look-up table, wherein the low-pass filter receives operating parameters based on data regarding an operating environment of the motor system. The method then further determines a corrected torque value based on the corrected flux component value.

18 Claims, 5 Drawing Sheets

(56) References Cited

U.S. PATENT DOCUMENTS

2019/0229664 A1* 7/2019 Kobayashi .............. H02P 21/22
2019/0363588 A1* 11/2019 Daetwyler ............ B60L 53/124
2020/0114900 A1* 4/2020 Lee ....................... B60W 20/30
2020/0389110 A1* 12/2020 Yajurvedi ........... H02P 29/0241

* cited by examiner

METHOD FOR ONLINE DIRECT ESTIMATION AND COMPENSATION OF FLUX AND TORQUE ERRORS IN ELECTRIC DRIVES

CROSS-REFERENCE TO RELATED APPLICATION

This application is a continuation of, and claims priority under 35 U.S.C. § 120 from, U.S. patent application Ser. No. 16/730,218, filed on Dec. 30, 2019. The disclosure of this prior application is considered part of the disclosure of this application and is hereby incorporated by reference in its entirety.

BACKGROUND

The present disclosure relates to an online method of detecting and compensating for errors in flux estimation during operation of a motor system.

Permanent magnet electric motors (PM e-motors) are used in electric vehicle (EV) powertrains. The control algorithms of these e-motors are developed in microprocessors using e-motor software (SW). These control algorithms indirectly control the torque to its command by regulating the current components to their commands, which are in turn calculated based on the torque command and flux calibration tables of the motor. On the other hand, the achieved torque is estimated based on the sensed current components and the flux calibration tables. Therefore, in order to achieve the desired performance, it is important to ensure the accuracy of the SW calibration tables. Any error in SW calibration tables reduces the accuracy of the torque control process. Such errors are inevitable—the motor features non-linear behavior, the accuracy of measurement devices is limited, and the motor permanent magnet flux is dependent on the motor's temperature, which in turn is dependent on a large number of performance variables. An online (i.e. real-time, in operation) method as a supplement or alternative to calibration tables to estimate and compensate for the flux errors can improve the torque accuracy of electric motor drives.

Some previous online methods have been proposed to estimate the errors in flux tables of the motor. These previously proposed methods have different problems such as 1) indirect calculation of flux errors without full control over the dynamic behavior of the compensation and 2) no simultaneous compensation of the flux, actual torque, and estimated torque at the same time. It is desirable to find an online method of flux estimation that can both detect and control for flux, actual torque, and estimated torque.

SUMMARY

Disclosed herein is a novel online estimation and compensation algorithm. This proposed method directly calculates the amount of errors in the flux values and compensates for the errors with a low-pass filter with a determined transient behavior. It then compensates the torque values such that the actual and estimated torques are also compensated at the same time. To set up this control algorithm, a mathematical analysis is first performed to study the behavior of the flux values with control variables in e-motor drives.

Disclosed herein is an online method of detecting and compensating for errors in flux estimation during operation of a motor system. In one embodiment, the method comprises determining a voltage compensation term by comparing an expected voltage and an actual voltage, determining a flux compensation term by passing the voltage compensation term through a low-pass filter, and determining a corrected flux component value by comparing the flux compensation term with a look-up table flux value. In one embodiment, the low-pass filter receives operating parameters based on data regarding an operating environment of the motor system. In another disclosed embodiment, the method further determines a corrected torque value based on the corrected flux component value.

In another disclosed embodiment, the received operating parameters include at least one of a cutoff frequency and a period length. In another disclosed embodiment, data regarding the operating environment of the vehicle includes data regarding at least one of heat, aging, and saturation of at least one component of the motor system.

Other aspects, features, and techniques will be apparent to one skilled in the relevant art in view of the following detailed description of the embodiments.

BRIEF DESCRIPTION OF THE DRAWINGS

The features, objects, and advantages of the disclosed embodiments will become more apparent from the detailed description set forth below when taken in conjunction with the drawings in which like reference characters identify correspondingly throughout and wherein.

DETAILED DESCRIPTION

Figure 1:
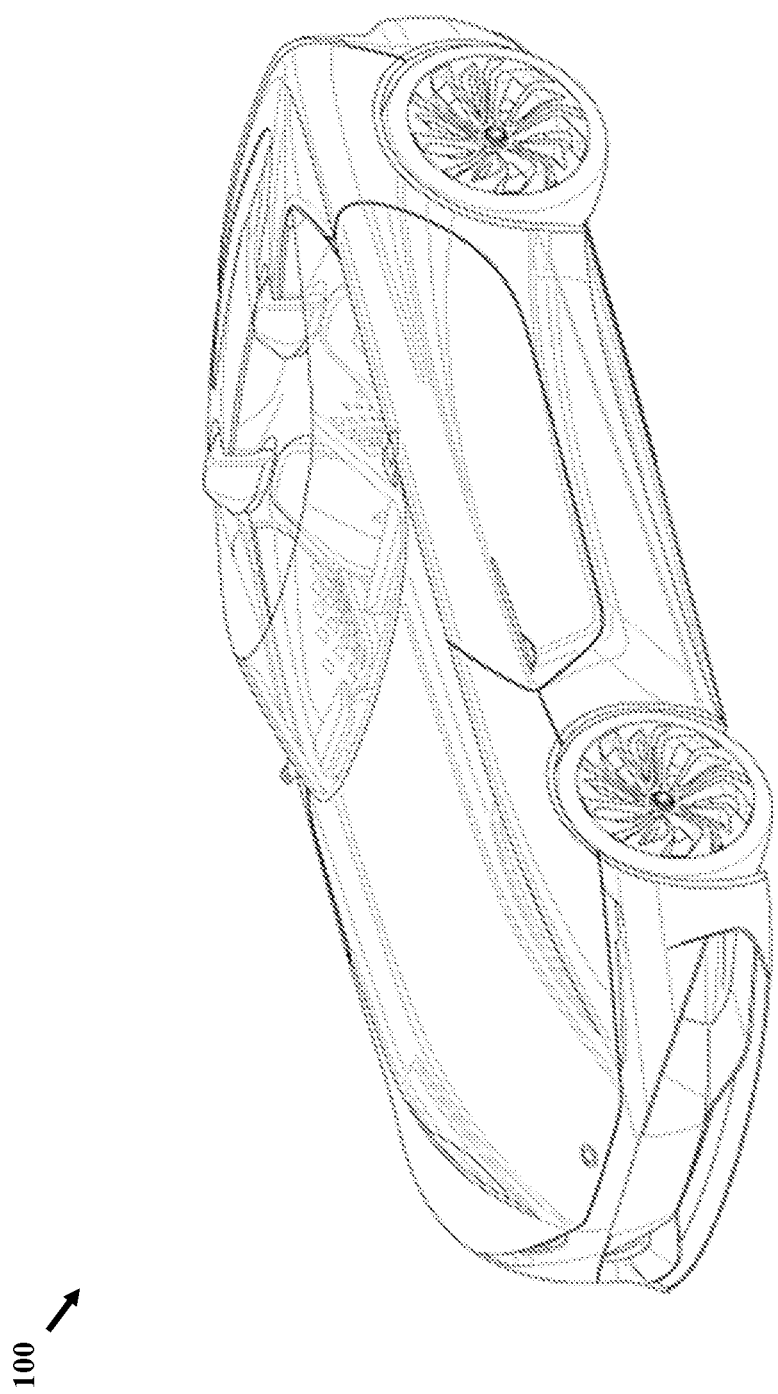
FIG. 1 is a perspective view depicting an exemplary embodiment of an electric vehicle that may include an electric motor drive system.

One aspect of the disclosure is directed to an online method of detecting and compensating for errors during flux estimation during operation of a motor system.

References throughout this document to "one embodiment," "certain embodiments," "an embodiment," or similar term mean that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. For example, two or more of the innovative methods described herein may be combined in a single method, but the application is not limited to the specific exemplary combinations of methods that are described herein.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As used herein, the term "online" acts above and hereinafter as an adjective to describe a task performed by a system while the system is in operation or active service. This is in contrast to offline tasks performed in a laboratory setting, with the results then compiled for use in a look-up table.

The character "N" refers hereinafter to the last member of a set or the total count of members in a set. The character "X" refers hereinafter to a variable member of a set. The characters "A", "B", "C", etc. refer to a specific but otherwise undefined member of a set.

For ease of reference, a list of the variables used throughout the document is provided as follows:

$v_d$, $v_q$: voltage components (d- and q-axes)
$v_d^{exp}$, $v_q^{exp}$: expected voltage components (d- and q-axes)
$\Delta v_d$, $\Delta v_q$: voltage compensation terms (d- and q-axes)
$i_d$, $i_q$: current components (d- and q-axes)
$i_d^{cmd}$, $i_q^{cmd}$: commanded current components (d- and q-axes)
$\psi_d$, $\psi_q$: flux components (d- and q-axes)
$\psi_d^{LUT}$, $\psi_q^{LUT}$: flux components, based on look-up table (d- and q-axes)
$\psi_{PM}$: permanent magnet flux
$\omega$: synchronous rotor speed
$L_d$, $L_q$: stator inductance (d- and q-axes)
$L_d^{LUT}$, $L_q^{LUT}$: stator inductance, based on look-up table (d- and q-axes)
P: motor pole count
R: stator resistance
T: actual torque
$T^{cmd}$: commanded torque
$T^{cmd,new}$: commanded torque, corrected A detailed description of various embodiments is provided; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the disclosed embodiments.

FIG. 1 is a perspective view depicting an exemplary embodiment of an electric vehicle 100 that may include an electric motor drive system 200. The electric vehicle 100 shown in FIG. 1 is exemplary. The electric motor drive system 200 may be installed in any vehicle employing an electric motor drive system, including but not limited to hybrid vehicles.

Figure 2:
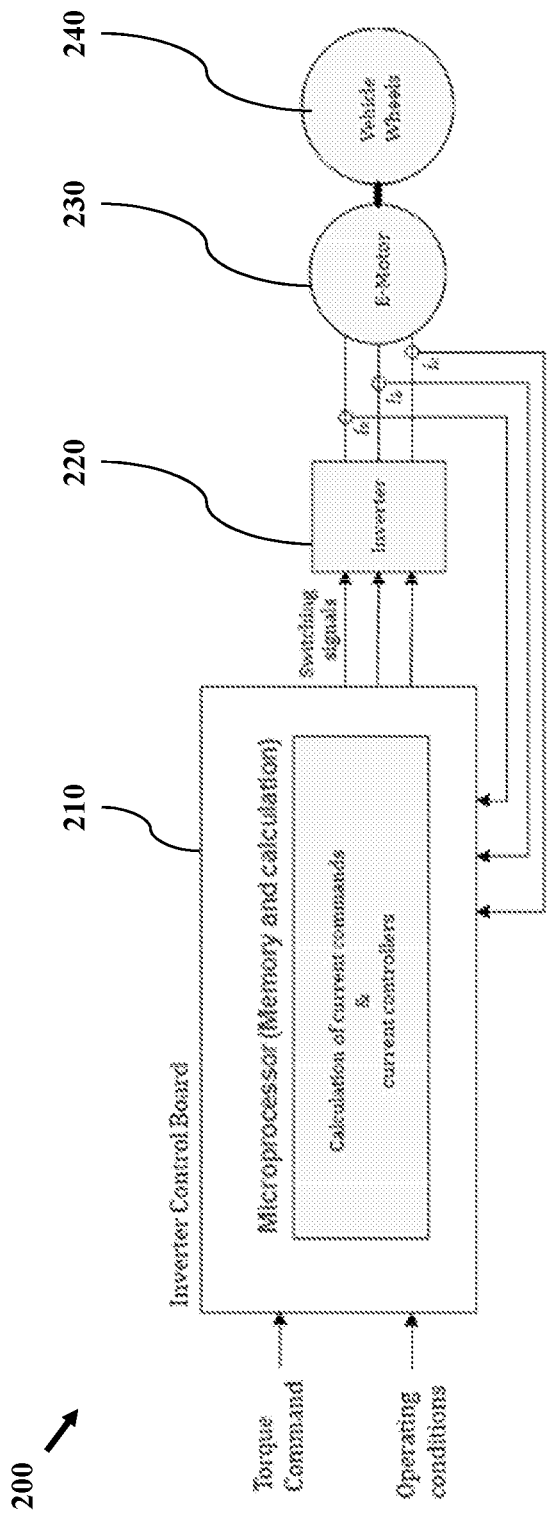
FIG. 2 is a flow diagram depicting the structure of an exemplary electric motor drive system for use in electric vehicles.

FIG. 2 is a flow diagram depicting the structure of an exemplary electric motor drive system 200 in electric vehicles 100. In one embodiment, the proposed flux and torque compensation algorithm is a part of the e-motor SW implemented on the control board 210 of the inverter 220. The control board 210 is supposed to control the inverter 220 in such a manner as to achieve the commanded torque value for the electric motor 230 with a good dynamic and steady-state response.

Figure 3:
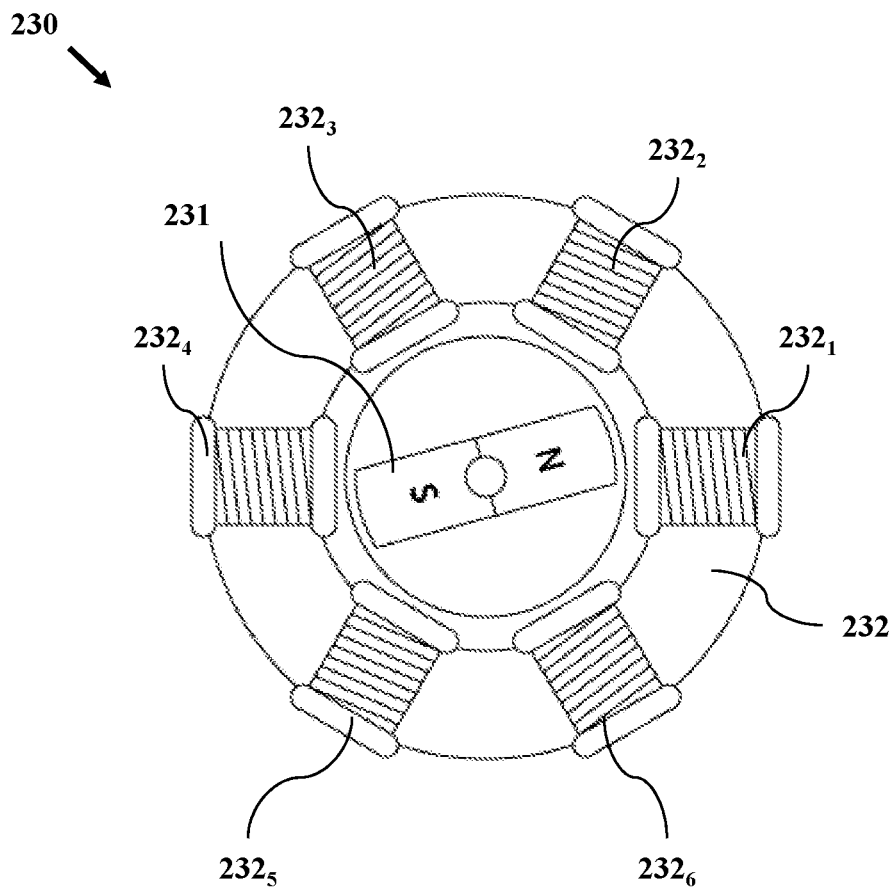
FIG. 3 is a side view depicting an exemplary embodiment of an electric motor for use in an electric vehicle.

FIG. 3 is a side view depicting an exemplary embodiment of an electric motor 230 for an electric vehicle 100. In one embodiment, the electric motor 230 includes a rotor 231 and a stator 232 with a plurality of stator coils $232_{1-P}$, where P is the number of stator coils 232 comprising the stator 232 (here, P=6). In one embodiment, the rotor 231 may include a permanent magnet. In one embodiment, the stator coils $232_{1-P}$ may receive power from the inverter 220 to produce a magnetic field by means of space vector pulse width modulation. In one embodiment, the electric motor drive system 200 rotates the magnetic field of the stator 232 in order to induce rotation in the rotor 231 and propel the electric vehicle 100.

Figure 4:
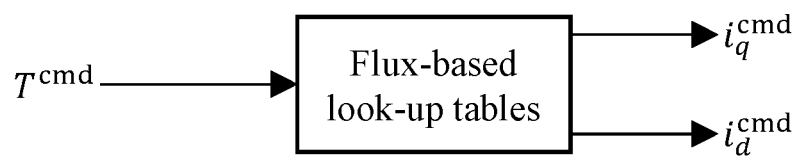
FIG. 4 is a block diagram depicting an exemplary embodiment of reference current calculation.

FIG. 4 is a block diagram depicting an exemplary embodiment of reference current calculation. In one embodiment of an electric motor drive system 200, the commanded current components ($i_d^{cmd}$ and $i_q^{cmd}$) are first calculated from the commanded torque ($T^{cmd}$) and flux based on look-up tables (LUTs) as shown in FIG. 4. Then, in one embodiment, the current controllers regulate the current components to these commands by applying appropriate voltage components. In one embodiment, while in a steady state condition, the control SW applies the following voltage components to the inverter 221, assuming that the variables used in Eq. (1) and (2) are the actual values of motor variables:

$$v_d = Ri_d - \omega L_q i_q = Ri_d - \omega \psi_q, \quad (1)$$

$$v_q = Ri_q + \omega \times (L_d i_d + \psi_{PM}) = Ri_q + \omega \psi_d, \quad (2)$$

where $v_d$ and $v_q$ are the voltage components; $i_d$ and $i_q$ are the current components; $\psi_d$ and $\psi_q$ are the flux components, $\psi_{PM}$ is the permanent magnet flux; R is the stator 232 resistance; $\omega$ is the synchronous rotor 231 speed; and $L_d$ and $L_q$ are the stator 232 inductances in d- and q-axes. In one embodiment, by controlling the current components of the electric motor, the following electromagnetic torque is produced:

$$T = \frac{3}{2}\frac{P}{2}[\psi_{PM} i_q + (L_d - L_q)i_d i_q] = \frac{3}{2}\frac{P}{2}[\psi_d i_q - \psi_q i_d]. \quad (3)$$

where P is the number of motor poles. Typically, the LUTs in the SW are calibrated based on the assumption of a standard operating condition (constant temperature, minimal component wear and tear, etc.). However, in practice, operating conditions may not be constant due to aging, heat, and saturation, all of which can result in an error in flux calculations. Consequently, the actual torque T is rarely equal to $T^{cmd}$, and a compensation algorithm is needed.

Figure 5:
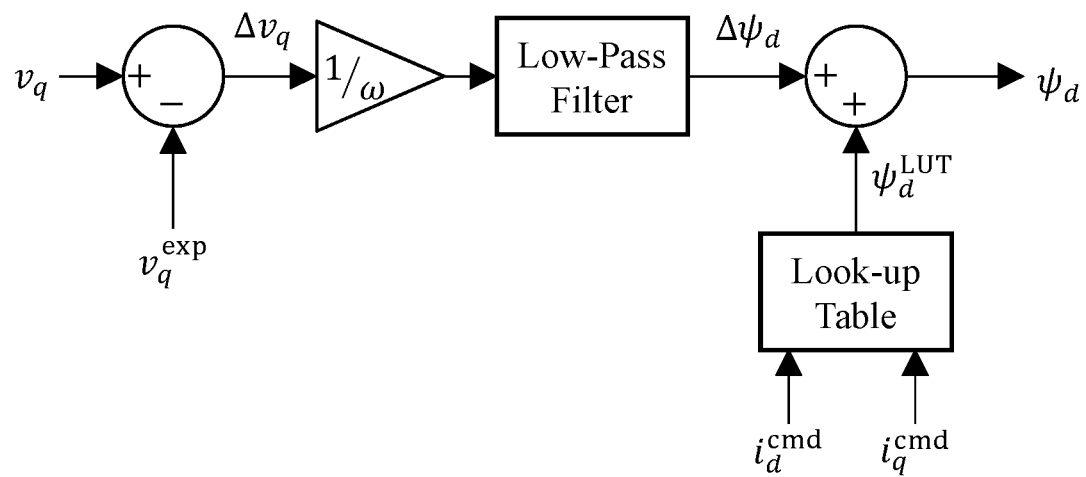
FIG. 5 is a block diagram depicting an exemplary embodiment of a flux compensation algorithm.
Figure 5:
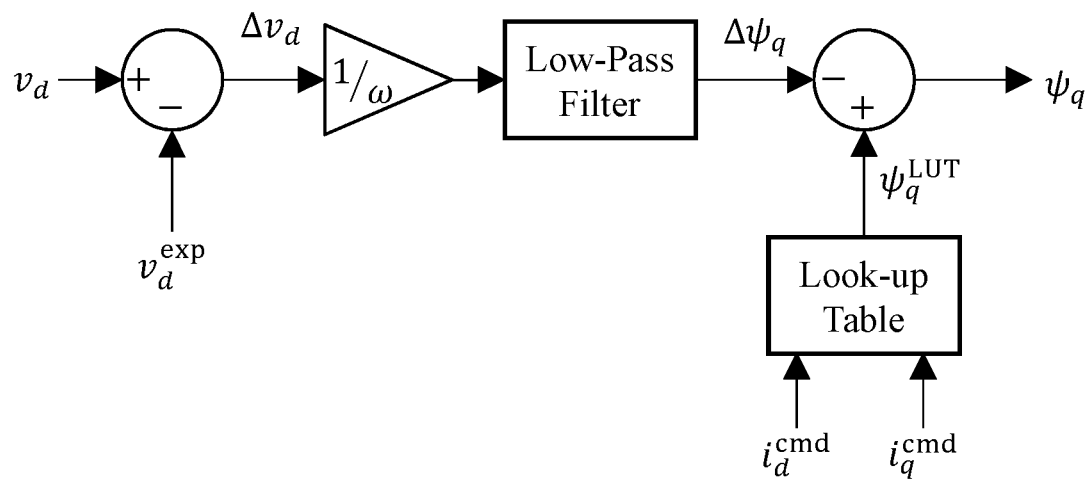

FIG. 5 is a block diagram depicting an exemplary embodiment of a flux compensation algorithm 500 that may be implemented on the control board and microprocessor 210. In one embodiment, to overcome the shortcoming in applying the commanded torque value $T^{cmd}$ and to compensate for the error, the flux compensation algorithm 500 calculates and mitigates the flux error by introducing new variables: Expected Voltage Components. In one embodiment of this algorithm 500, the expected voltage components ($v_d^{exp}$ and $v_q^{exp}$) are compared with the actual voltages ($v_d$ and $v_q$) applied to the inverter 220 to directly calculate the error in flux components. Then, in one embodiment, the errors are reduced to zero with a determined dynamic using a low-pass filter with specific time constants. In one embodiment, the expected voltage components are calculated as $$v_d^{exp} = Ri_d - \omega(L_q^{LUT} i_q) = Ri_d - \omega \psi_q^{LUT}, \quad (4)$$

$$v_q^{exp} = Ri_q + \omega \times (L_d^{LUT} i_d + \psi_{PM}^{LUT}) = Ri_q + \omega \psi_d^{LUT}, \quad (5)$$

where $v_d^{exp}$ and $v_q^{exp}$ are the expected voltage components; and $\psi_d^{LUT}$, $\psi_q^{LUT}$, $L_d^{LUT}$, and $L_q^{LUT}$ are the look-up table-based flux and inductance values. In one embodiment, the compensation terms ($\Delta v_d$ and $\Delta v_g$) can be derived based on the difference between the actual and expected voltage components as $$\Delta v_d = v_d - v_d^{exp} = -\omega(L_q i_q - L_q^{LUT} i_q) \qquad (6)$$
$$= -\omega(\psi_q - \psi_q^{LUT})$$
$$= -\omega \Delta \psi_q,$$

$$\Delta v_q = v_q - v_q^{exp} = \omega \times (L_d i_d + \psi_{PM} - L_d^{LUT} i_d + \psi_{PM}^{LUT})$$
$$= \omega(\psi_d - \psi_d^{LUT}) \qquad (7)$$
$$= \omega \Delta \psi_d,$$

where the actual values of the flux components in steady state are $$\psi_d = \psi_d^{LUT} + \Delta \psi_d = \psi_d^{LUT} + \frac{\Delta v_q}{\omega}, \qquad (8)$$

$$\psi_q = \psi_q^{LUT} + \Delta \psi_q = \psi_q^{LUT} - \frac{\Delta v_d}{\omega}. \qquad (9)$$

It should be noted that these relations between actual and expected flux values are valid in steady state conditions. Therefore, the proposed algorithm uses low-pass filters to make flux values move from their LUT values toward their actual values calculated in (8) and (9) as shown in FIG. 5. In one embodiment, the low-pass filters have specific and predetermined time constants that ensure control over the dynamic response of the compensations.

The low-pass filter may be configured to receive operating parameters based on data regarding an operating environment of the motor system. These received operating parameters may include at least one of a cutoff frequency and a period length. The data regarding the operating environment of the vehicle may include data regarding at least one of heat, aging, and saturation of at least one component of the motor system. Various standard and conventional sensors may be provided for obtaining the data and providing the data to the controller for use in configuring the low-pass filter.

In one embodiment, the flux compensation algorithm 500 estimates the flux components using the difference between the actual and expected voltage components and low-pass filters with specific time constants. The implementation of the flux compensation algorithm 500 is simple and not computationally heavy for microprocessors such as the microprocessor of the inverter control board 210.

Figure 6:
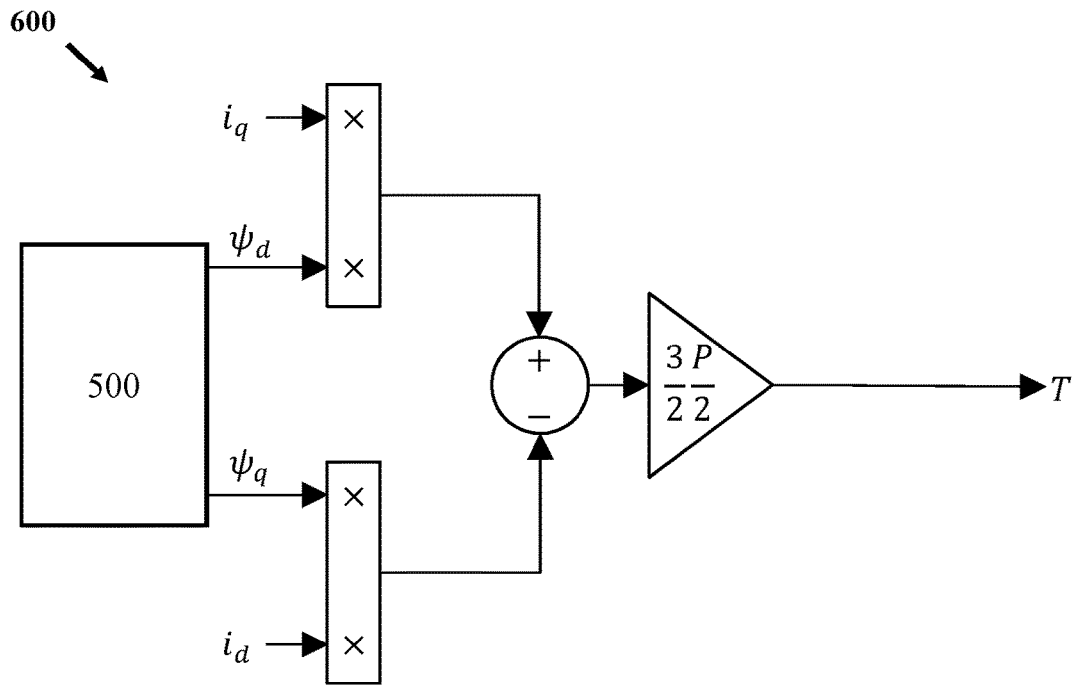
FIG. 6 is a block diagram depicting an exemplary embodiment of a torque compensation algorithm.
Figure 6:
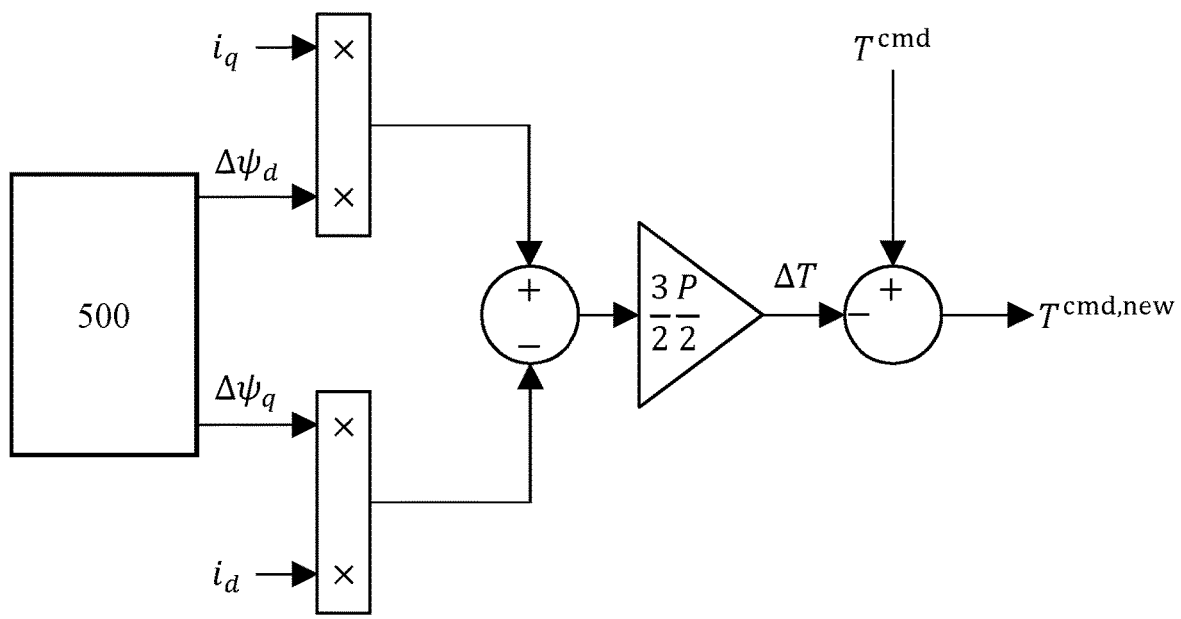

FIG. 6 is a block diagram depicting an exemplary embodiment of a torque compensation algorithm 600 that may be implemented on the control board and microprocessor 210. In one embodiment, the torque compensation algorithm 600 compensates for the difference between the estimated torque and commanded torque to increase the torque accuracy and torque command tracking capabilities of the drive system 200. In one embodiment, when the errors in flux components are calculated and compensated as per the flux compensation algorithm 500, the new flux values can be used in (3) to compensate for the estimated torque error as such:

$$\Delta T = \frac{3}{2} \frac{P}{2} [(\Delta \psi_d) i_q - (\Delta \psi_q) i_d], \qquad (10)$$

which increases the torque accuracy of the drive system 200. In addition, the difference between the torque values $\Delta T$ (calculated using actual fluxes and LUT fluxes) is then added to the torque command $T^{cmd}$ to achieve a more accurate torque command $T^{cmd,new}$ and increase the torque command tracking capability of the system 200.

While this disclosure makes reference to exemplary embodiments, it will be understood by those skilled in the art that various changes in form and details may be made therein without departing from the scope of the claimed embodiments.

What is claimed is:

1. A computer-implemented method when executed on a microprocessor causes the microprocessor to perform operations comprising:
   receiving a torque command for powering an electric motor drive system, the electric motor drive system comprising an electric motor and an inverter;
   determining a voltage compensation term based on an expected voltage and an actual voltage;
   determining, using a low-pass filter, a flux compensation term based on the voltage compensation term and operating parameters comprising at least one of a cutoff frequency or a period length, the operating parameters based on data regarding an operating environment of the electric motor drive system;
   determining a corrected flux compensation term by adding the flux compensation term to a look-up table flux value;
   correcting the torque command based on the corrected flux compensation term; and
   commanding the inverter to provide power to the electric motor to output an actual torque equal to the corrected torque command.

2. The computer-implemented method of claim 1, wherein the microprocessor resides on a control board of the inverter.

3. The computer-implemented method of claim 1, wherein the electric motor comprises a rotor and a stator having a plurality of stator coils.

4. The computer-implemented method of claim 3, wherein each stator coil of the plurality of stator coils generates a magnetic field when the inverter provides the power to the electric motor.

5. The computer-implemented method of claim 3, wherein the rotor comprises a permanent magnet.

6. The computer-implemented method of claim 1, wherein determining the voltage compensation term comprises determining the voltage compensation term based on a difference between the expected voltage and the actual voltage.

7. The computer-implemented method of claim 1, wherein the low-pass filter comprises a specific time constant and a predetermined time constant, wherein the specific time constant and the predetermined time constant ensures control over a dynamic response of the corrected torque command.

8. The computer-implemented method of claim 1, wherein the data regarding the operating environment of the electric motor drive system comprises data regarding at least one of heat, aging, or saturation of at least one component of the electric motor drive system.

9. The computer-implemented method of claim 1, wherein correcting the torque command comprises adding the corrected flux compensation term to an uncorrected torque command.

10. An electric motor drive system comprising:
an electric motor configured to rotate a wheel of a vehicle;
an inverter configured to power the electric motor; and
a microprocessor executing instructions that cause the microprocessor to perform operations comprising:
receiving a torque command for powering the electric motor drive system;
determining a voltage compensation term based on an expected voltage and an actual voltage;
determining, using a low-pass filter, a flux compensation term based on the voltage compensation term and operating parameters comprising at least one of a cutoff frequency or a period length, the operating parameters based on data regarding an operating environment of the electric motor drive system;
determining a corrected flux compensation term by adding the flux compensation term to a look-up table flux value;
correcting the torque command based on the corrected flux compensation term; and
commanding the inverter to provide power to the electric motor to output an actual torque equal to the corrected torque command.

11. The electric motor drive system of claim 10, wherein the microprocessor resides on a control board of the inverter.

12. The electric motor drive system of claim 10, wherein the electric motor comprises a rotor and a stator having a plurality of stator coils.

13. The electric motor drive system of claim 12, wherein each stator coil of the plurality of stator coils generates a magnetic field when the inverter provides the power to the electric motor.

14. The electric motor drive system of claim 12, wherein the rotor comprises a permanent magnet.

15. The electric motor drive system of claim 10, wherein determining the voltage compensation term comprises determining the voltage compensation term based on a difference between the expected voltage and the actual voltage.

16. The electric motor drive system of claim 10, wherein the low-pass filter comprises a specific time constant and a predetermined time constant, wherein the specific time constant and the predetermined time constant ensures control over a dynamic response of the corrected torque command.

17. The electric motor drive system of claim 10, wherein the data regarding the operating environment of the electric motor drive system comprises data regarding at least one of heat, aging, or saturation of at least one component of the electric motor drive system.

18. The electric motor drive system of claim 10, wherein correcting the torque command comprises adding the corrected flux compensation term to an uncorrected torque command.

* * * * *